(12) United States Patent     (10) Patent No.: US 9,178,314 B2
Dickens et al.     (45) Date of Patent: Nov. 3, 2015

(54) ELECTRONIC DEVICE SECURITY

(75) Inventors: Nigel Dickens, Cambridge (GB); Camelin Caine, Cambridge (GB)

(73) Assignee: Adder Technology Limited, Cambridge (GB)

( * ) Notice: Subject to any disclaimer, the term of this patent is extended or adjusted under 35 U.S.C. 154(b) by 1103 days.

(21) Appl. No.: 13/149,736

(22) Filed: May 31, 2011

(65) Prior Publication Data

US 2012/0307436 A1    Dec. 6, 2012

(51) Int. Cl.
*H05K 9/00*      (2006.01)
*H01R 13/6461*      (2011.01)
*H01R 13/6581*      (2011.01)
*G06F 1/16*      (2006.01)

(52) U.S. Cl.
CPC .......... *H01R 13/6461* (2013.01); *G06F 1/1656* (2013.01); *H01R 13/6581* (2013.01)

(58) Field of Classification Search
CPC ........... H01R 13/6586; H01R 13/6461; H01R 13/6581; H01R 13/65807; H01R 13/6585
USPC .......... 439/607.53, 607.54, 607.55; 361/785, 361/796, 789, 800, 816, 818
See application file for complete search history.

(56) References Cited

U.S. PATENT DOCUMENTS

| | | | |
|---|---|---|---|
| 7,270,570 B1 * | 9/2007 | Hamner et al. | 439/607.04 |
| 7,288,001 B1 | 10/2007 | Aekins | |
| 2007/0026736 A1 | 2/2007 | Itano et al. | |
| 2009/0098777 A1 * | 4/2009 | AbuGhazaleh et al. | 439/676 |

FOREIGN PATENT DOCUMENTS

| WO | WO 2006/065972 | 6/2006 |
|---|---|---|
| WO | WO 2007/044855 | 4/2007 |
| WO | WO 2010/065588 | 6/2010 |

OTHER PUBLICATIONS

Search Report dated Dec. 6, 2012 from GB Application No. 1209067.6.

* cited by examiner

*Primary Examiner* — Robert J Hoffberg
*Assistant Examiner* — Hung Dang
(74) *Attorney, Agent, or Firm* — Beyer Law Group LLP (57) ABSTRACT

Apparatus and methods for reducing cross talk between electrical ports are described. An electronic device comprises a housing for electronic circuitry and has a plurality of ports for connecting electrical devices. Each port includes a connector connected by at least one electrical connection to the electronic circuitry. A connector shield is arranged to provide an electrically conductive loop around which an induced electrical current can flow to reduce cross-talk between ports. A shielding can is part of the connector shield and includes a body formed of a folded sheet of electrically conductive material and an electrical contact for electrically connecting the body to a connector. A face of the body defines a first aperture shaped to receive the connector so that the shielding can may be arranged about the connector to form a part of the electrically conductive loop. The method includes providing a connector shield arranged about each connector to provide an electrically conductive loop and inducing an electrical current to flow about the electrically conductive loop to reduce cross-talk between ports.

19 Claims, 7 Drawing Sheets

ELECTRONIC DEVICE SECURITY

BACKGROUND OF THE INVENTION

1. Field of the Invention

The present invention relates to electronic device security and in particular to apparatus, parts, methods and system for improving the security of electronic devices to which other electrical devices can be attached by connectors to transfer data using electrical signals.

2. Description of the Prior Art

There are a wide variety of applications in which different electrical devices are connected to together to allow data to be sent, received, or exchanged using electrical signals. When security is an issue, the communication of data can be protected in a number of ways, including hardware approaches and software approaches and combinations thereof. An example of a software approach would be to transfer data using encryption. An example of a hardware approach would be to use physical measures to limit access or use of devices to authorised personnel. However, there are many ways in which security measures can be overcome or reduced.

For convenience and space saving reasons, there is often a requirement to use a single keyboard, mouse and video display (a KVM console) to control two or more computers. A group of products known as KVM switches are commonly available to address this requirement. In various government and commercial applications, it is also desirable to use KVM switches to connect to computers that are operating at different levels of classification or security whilst ensuring, as far as possible, that information does not leak between these systems. Typical applications for such secure KVM switches may be found within government agencies, banks, law enforcement, armed services, health providers and any other public or private organisation that wishes to protect the data that it is processing whilst also taking advantage of the desktop convenience that a KVM switch provides. Secure KVM switches have been available for many years from companies such as Black Box Corporation, Avocent, Belkin and others. Many such secure KVM switches are designed to meet the requirements of Common Criteria Evaluation Assurance Level 4 and variously include a range of features that are designed to minimize the risk of data leaking between the connected computers or to the outside work.

It would therefore be beneficial to be able to provide an electronic device, or parts thereof, with enhanced security.

SUMMARY OF THE INVENTION

In order to help improve the security of an electronic device, a shielded connector is provided which helps to reduce cross-talk between electrical ports of the electronic device. Doing so helps to reduce the potential to use such signals to lessen the security of the device.

In particular, the port-to-port crosstalk limitations that are inherent when using various standard style connectors are addressed by providing connector shields within the enclosure of the electronic device that, as far as possible, provide a 360 degree conductive shielding path in particular planes. The 360 degree conductive shielding can counteract crosstalk caused by small electromagnetic fields that are generated by and picked up by the conductors within adjacent port connectors. Reducing crosstalk between ports can help to reduce the risk of information on one computer being accessible on another computer that is connected to the electronic device.

In some embodiments, a circuit board ground plane within the electronic device is arranged to co-operate with one or more connector shields to form part of the 360 degree conductive path.

An aspect of the invention provides an electronic device, comprising a housing, electronic circuitry within the housing and one or more ports for connecting one or more electrical devices to the electronic device. Each port can include a connector and a connector shield. The connector can be connected by at least one electrical connection to the electronic circuitry. The connector shield can be arranged to provide an electrically conductive loop around which an induced electrical current can flow to reduce electromagnetic emissions from the or each port or to reduce cross-talk between ports.

The connector shield can be attached to the connector. A part of the connector can provide a part of the electrically conductive loop.

The connector shield can be connected to the connector at two different locations. A part of the connector can provide a part of the electrically conductive loop.

The connector shield can include or comprise a shielding can. The shielding can can be a closed shielding can. The shielding can can be an open shielding can.

A part of the connector shield can be provided by an electrically conductive part of the electronic circuitry. The electrically conductive part can be a ground plane of the electronic circuitry. The electronic circuitry can include a printed circuit board and the ground plane can be a part of the printed circuit board.

The connector shield can include a plurality of extended contacts. The printed circuit board can include a plurality of apertures. The plurality of extended contacts can pass through the apertures to electrically connect to the ground plane.

The at least one electrical connection can be arranged to conduct an electrical current in a first plane. The connector shield can be arranged to provide the electrically conductive loop in a second plane parallel to the first plane and/or in a further plane perpendicular to the first plane.

The electronic device can be a KVM switch and in particular a secure KVM switch.

A further aspect of the invention provides a computing system. The computing system can comprise a first computing device, a second computing device and an electronic device according to the first aspect of the invention. The electronic device can have a first connector and a second connector. A first cable can be provided between the first computing device and the first connector. A second cable can be provided between the second computing device and the second connector.

The first cable can be a shielded cable including a plurality of wires. The first cable can have a first cable connector. The second cable can be a shielded cable including a plurality of wires. The second cable can have a second cable connector. Each cable connector can comprise a housing, a plurality of electrical contacts, and a support supporting the plurality of electrical contacts. Each wire of the plurality of wires can be attached to a respective one of the plurality of electrical contacts. An electrical shield can be connected between the support and the shielding of the cable and surrounding the plurality of wires adjacent where they attach to the electrical contacts and be arranged to electromagnetically shield the cable connector.

The electronic device can be a secure KVM switch. The first computer can be a secure computer. The second computer can be a less secure or an unsecure computer. The system can further comprise at least one input device attached to the secure KVM switch.

A further aspect of the invention provides a shielding can being a part of a connector shield for reducing cross talk between ports of an electrical device. The shielding can can include a body formed of a folded sheet of electrically conductive material. The shielding can can include an electrical contact for electrically connecting the body to a connector. A face of the body can define a first aperture shaped to receive the connector therein so that the shielding can may be arranged about the connector to form a part of an electrically conductive loop.

The shielding can can have a generally rectangular shape.

The body can include fold regions created by less thick parts of the shielding can.

The shielding can can include a plurality of extended electrical contacts which extend from one or more edges of the can.

The face of the body further can define a pair of apertures positioned about the first aperture to receive a pair of fixings for securing a plug to the connector.

A further aspect of the invention provides a method for reducing the cross-talk between ports of an electronic device. The electronic device can include a housing and electronic circuitry enclosed within the housing, each port including a connector connected by at least one electrical connection to the electronic circuitry. A connector shield can be provided arranged about each connector to provide an electrically conductive loop. An electrical current can be induced to flow about the electrically conductive loop to reduce cross-talk between ports.

Embodiments of the invention will now be described, by way of example only, and with reference to the accompanying drawings.

DESCRIPTION OF THE PREFERRED EMBODIMENTS

In the drawings, the same features in different drawings have common reference numerals unless indicated otherwise.

An embodiment of the invention will be described with reference to the example of a secure KVM switch being used as part of a partially secure computing system. However, it will be appreciated that the invention is not limited to such devices nor to that specific example application. Rather, the invention can be used in many different applications and as part of many different types of electronic devices. Indeed, the invention can be used as part of any electronic device which can be connected to another electronic device by a connector in order to send or receive electrical signals, so as to reduce the electro-magnetic emissions from the connector. Hence, the invention can be useful in any application in which it is desired to reduce electromagnetic emissions, and is not limited only to security applications.

Figure 1:
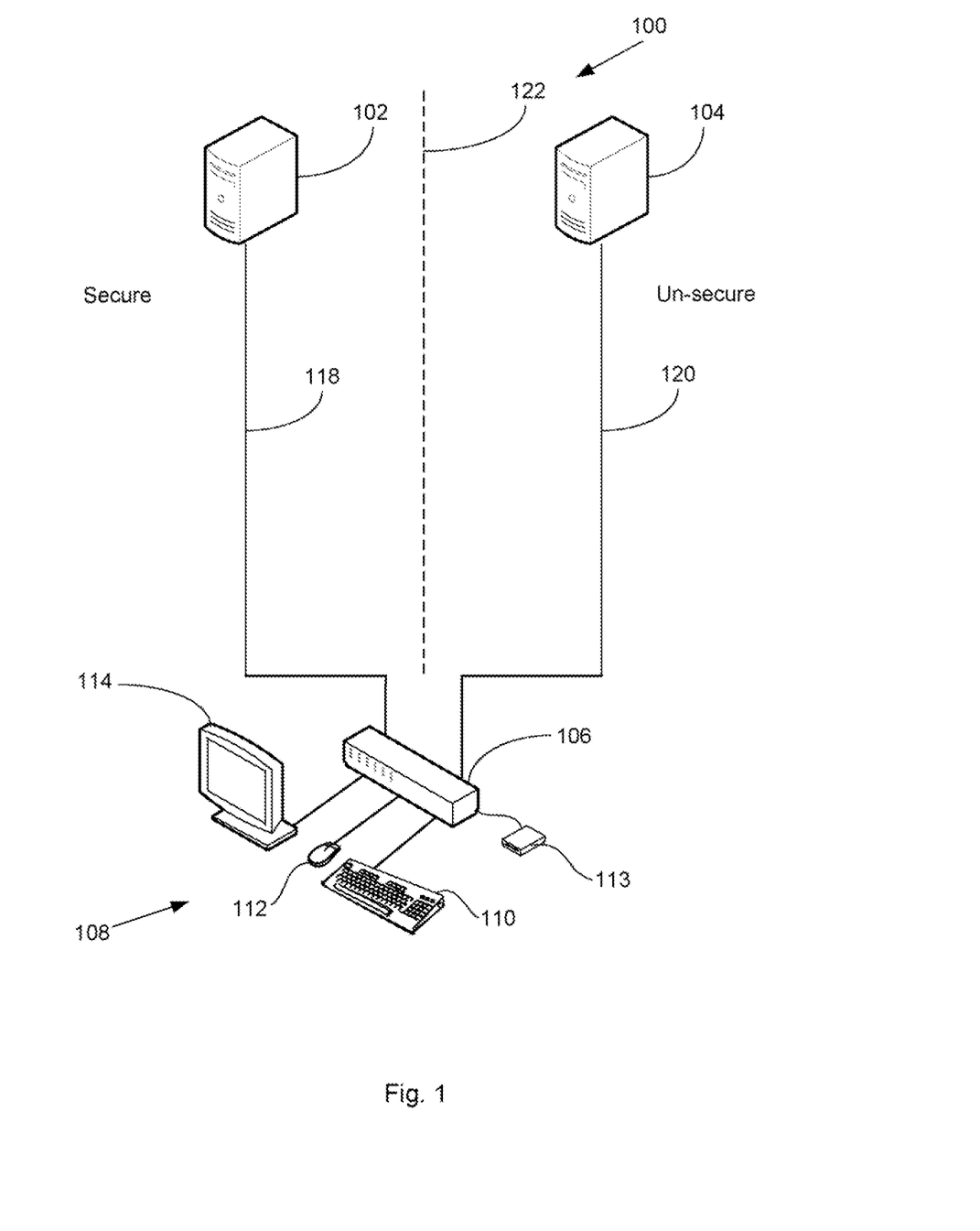
FIG. 1 shows a schematic diagram of a computing system according to the invention.

FIG. 1 shows a computing system 100 according to an aspect of the invention. The computing system includes a first computer 102, a second computer 104, a secure KVM switch 106 and a KVM console 108, comprising a keyboard 110, mouse 112 and display device 114 all connected to the KVM switch. A smart card reader 113 can also be provided as an input device. The smart card reader can be separate to the keyboard or in other embodiments is integrated into the keyboard. The keyboard, mouse, smartcard reader and display device are each connected to the secure KVM switch by a respective cable terminated by a cable connector. The first computer 102 is connected to the secure KVM switch 106 by a first, shielded cable 118 terminated in a male D-type connector which plugs into a first port of the KVM switch provided by a female D-type connector of the KVM switch. Shielded cable 118 is connected to the video, smartcard (if present) mouse and keyboard ports of the first computer. The second computer 104 is connected to the secure KVM switch 106 by a second cable 120 terminated in a male D-type connector which plugs into a second port of the KVM switch provided by a female D-type connector of the KVM switch. Second cable 120 is connected to the video, smartcard (if present) mouse and keyboard ports of the second computer. The first computer 102 is a secure computer and the second computer 104 is either less secure than the first computer, not specifically secure or unsecure. The difference in the level of security of the first and second computers is illustrated graphically by dashed line 122. The first shielded cable 118 is especially adapted to improve its security and is described in greater detail below with reference to FIGS. 10 to 12.

The KVM switch 106 is used to share the keyboard 110, mouse 112, smartcard reader 113 and display device 114 between the plurality of computers 102, 104 and provides reduced port to port electrical crosstalk between the computers via the equipment. Although the described KVM switch can support up to four computers, only two are shown in FIG. 1 for simplicity of explanation. A greater or lesser number of computers can be supported by the KVM switch.

The port-to-port crosstalk limitations that are inherent when using various standard style connectors are addressed by including connector shields within the equipment enclosure of the KVM switch that, as far as possible, provide a 360 degree conductive shielding path in particular planes as described in greater detail below. The 360 degree conductive shielding helps to efficiently counteract crosstalk caused by small electromagnetic fields that are generated by and picked up by the conductors within adjacent port connectors. In some embodiments, the circuit board ground plane within the KVM switch is configured to work together with the shields to form part of the 360 degree conductive paths. While this is not essential in order usefully to reduce cross talk, it is believed that doing so reduces crosstalk signals to their barest minimum and thereby minimising the risk of information on one computer being accessible on another computer that is connected to the same equipment by the KVM switch.

As it is not possible to know in advance with any certainty what level of electrical crosstalk may be detectable from one computer to another (due to the differences in the connected computers and operating environments), a design approach has been taken which tries to avoid the most obvious problems and have the lowest possible port-to-port electrical crosstalk level within the constraints of a practicable KVM switch. This involves using some generally known techniques for circuit board layout, signal filtering and cable shielding. However, it is not possible to filter (bandwidth reduce) all high frequency signals, such as video signals, without degrading their fidelity unacceptably. It is therefore still necessary to pass high frequency signals through the KVM switch. In particular, high frequency video signals cannot be substantially filtered without loss of fidelity and this class of signal may be more prone to security risks than other signals due to the repetitive nature of the signal.

Once other issues have been addressed, the remaining issue that prevents the lowest practical level of port-to-port electrical crosstalk from being achieved is associated with the use of standard style connectors such as the DE-15 connector (conventionally known as the RGB connector) or the DVI connector. Both of these are commonly used to carry high frequency video signals. Such connector families are designed to be mounted onto metal panels and connected to shielded cables. By using a high quality, well constructed shielded cable, a well shielded metal electrical device enclosure and following good circuit board design practice, it is possible to use such connectors to achieve a very low emissions profile.

However, previously no attention has been paid to the shielding of such connectors within the electrical device enclosure itself and therefore conventionally the pins remain unshielded. Although this is not a problem for general applications, it is a problem in the context of secure electrical devices where the objective is to minimise the port-to-port crosstalk levels to the minimum that is practically achievable. As there is a practical limit to the overall size of electrical devices, the separation between adjacent ports is restricted in terms of physical distance. If left unshielded, the connector pins within the electrical device enclosure form a weak transformer between ports creating unwanted port-to-port crosstalk. This can be overcome by adding an extra internal shield onto the connectors which provides, as much as possible, a continuous 360 degree conductive path around the pins of the connector to strongly suppress the port-to-port crosstalk between adjacent port connectors.

The level of crosstalk between ports is governed by the weakest aspect of the overall design of the electrical device and so careful attention to detail should be applied to all aspects of the design. The KVM switch therefore also implements the following strategies that are generally known in the art. The KVM switch is housed in a well shielded metal enclosure and is connected to the various computers using well constructed braid and foil shielded cables. Any signals that may be bandwidth limited are heavily filtered to the metal enclosure as close as possible to the cable exit point from the enclosure. The electronic devices that provide connection between the various ports are chosen carefully to provide a high level of electrical isolation and where necessary two or more stages are used. Careful attention is also applied to the construction and layout of the circuit board ensuring that, as far as is practical, the signals are closely referenced to, or sandwiched between, ground planes and, where possible, routed on different layers from the signals of adjacent ports.

Each port is arranged to run off its own separate power supply so that the risk of signalling via a common power supply is minimised. In the illustrated embodiment, the individual port circuits are powered from the connected computer's keyboard or USB port and the keyboard, mouse, smartcard (if provided) and video drive circuitry for the display are powered from a separate power feed (not shown) into the KVM switch 106.

Furthermore, no microphone ports are included in the KVM switch 106 as otherwise the microphone input would enable very small analogue signals to be recorded and therefore presents a higher risk of data leakage than by means of electrical crosstalk. KVM switches that include microphone port connections are therefore considered to be potentially insecure for this reason.

Figure 2:
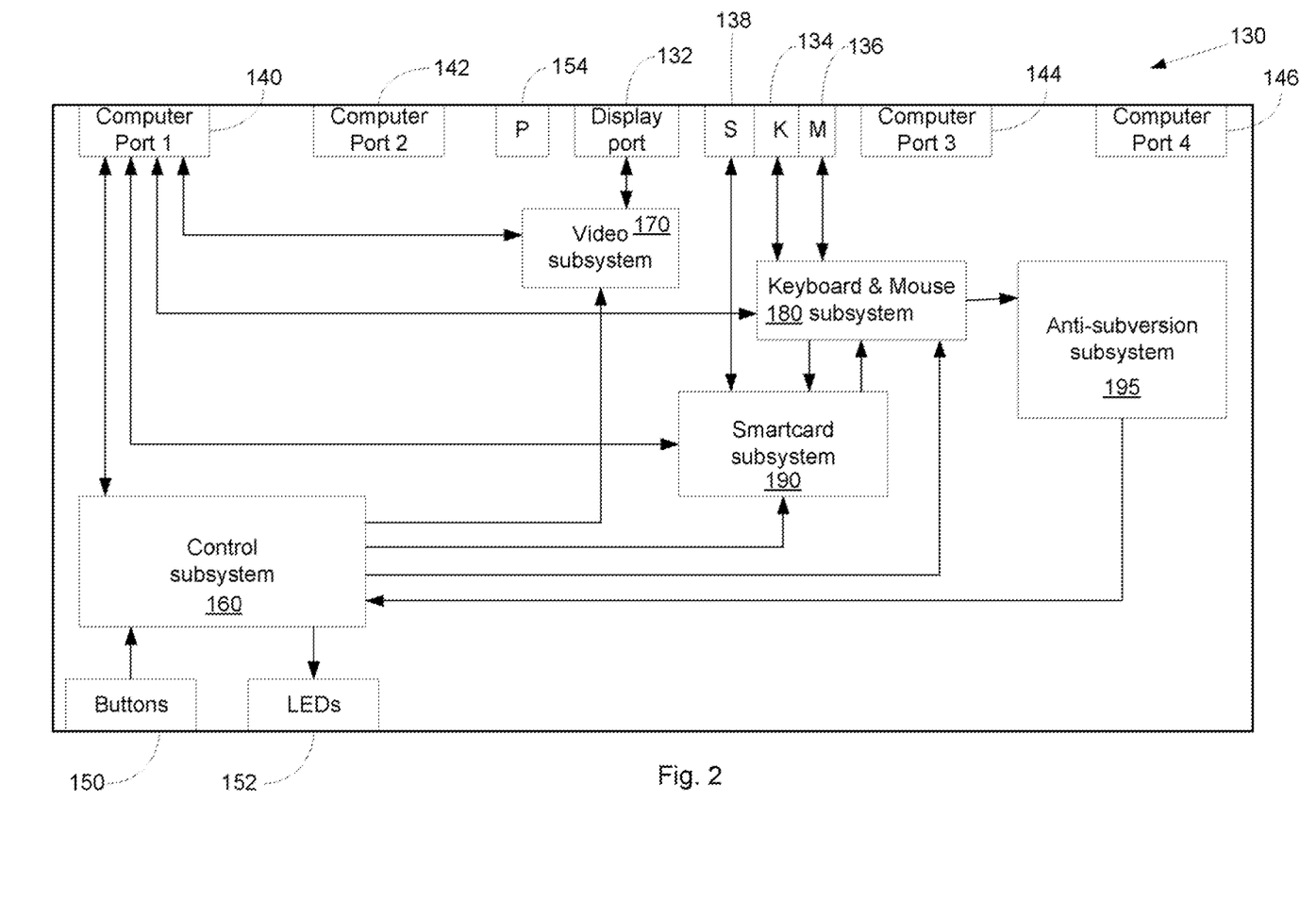
FIG. 2 shows a schematic diagram of the electronic structure of a KVM switch according to the invention and as used in the computing system of FIG. 1.

FIG. 2 shows a schematic view of the electrical circuitry 130 provided within the secure KVM switch. The secure KVM switch supports, as peripheral devices, a USB HID class keyboard, a USB HID class mouse, an analogue monitor or display device and a USB CCID class smartcard reader. The main features of the KVM switch include analogue video switching, EDID cloning, USB keyboard and mouse, USB or PS/2 keyboard and mouse emulation and smart card reader support. The local connections to the shared peripheral devices are made using industry standard connectors. The video or display port 132 is a 15 pin high density D type connector. The USB devices are connected to three separate USB type A connectors, one each for the keyboard (K) 134, mouse (M) 136 and smartcard (S) 138. There are four computer ports 140, 142, 144, 146 each of which is provided by a combined 26 pin high density connector to which a customised cable is connected (e.g. cable 118). Four selector buttons 150 are provided, one for each channel, with four LEDs 152 providing a respective indicator for each button. A power connector (P) 154 is also provided for an external source of power.

The electrical circuitry includes a control subsystem 160, a video subsystem 170, a keyboard and mouse subsystem 180, a smartcard subsystem 190 and an anti-subversion subsystem 195. As illustrated in FIG. 2, each of the computer port connectors is separately connected to the various subsystems of the electrical circuitry. FIG. 2 shows computer port 1 connector 140 in communication with the control, video, keyboard and mouse and smartcard subsystems. Computer ports two, three and four are similarly connected but this is not shown in FIG. 2 simply for ease of reading of the drawings.

In operation of the KVM switch, channel selection is made with one of the selector buttons 150 for each channel One channel is switched for another electronically. The routing of the video, keyboard and mouse data is controlled by enabling and disabling buffers, amplifiers or switches (not shown). Uni-directional data paths are created using electronic components that only allow the signals to flow in one direction. For keyboard and mouse data, these are logic buffers (buffering the input to the output), and for video data, this is a video amplifier, which amplifies the input to the output. Such devices are inherently uni-directional with defined input and output pins.

When a button 150 is pressed, all the data paths across the switch are immediately disconnected and the local USB hosts and keyboard/mouse/smartcard devices are powered down. When the button is released, after a debounce period, the new channel is latched to the control lines to each data path (but these are not yet enabled). After a further period the new data paths are enabled, and the USB hosts, keyboard/mouse/smartcard devices are powered on. The sequence is the same for the video, keyboard, mouse and smartcard data paths. This process of disabling the path, then changing channel before re-enabling the data paths prevent the switch from passing through any intermediate states and hence also improves its security.

The control subsystem 160 provides a control interface to the user, decodes selector button 150 input and passes appropriate channel selection control signals as output to the other subsystems and provides visual feedback to the user via LEDs 152. It also takes as an input an inhibit signal from an anti-subversion subsystem 195. The anti-subversion subsystem 195 can force the control subsystem to lock out the switch to prevent its operation. The control subsystem exercises control over the keyboard and mouse subsystem to control the power state of the peripheral devices, control the routing of the keyboard and mouse data and control access to an NCS module. The control subsystem also interacts with the video subsystem to control the routing of the video signals and also the smartcard subsystem to control the routing of smartcard data.

The video subsystem 170 includes a video switch module and an EDID and DDC module. The video subsystem 170 routes analogue video signals and digital synchronisation signals from the selected computer port to the shared video output port 132. It also clones and emulates the EDID from the display device 114 attached to the video output port 132 to each of the computer ports 140-146.

The keyboard and mouse subsystem 180 includes a USB host controller module, a routing module, various device emulation modules and an NCS module. The NCS module maintains the state of the keyboard, Num Lock, Caps Lock and Scroll Lock for each channel. The keyboard and mouse subsystem enumerates and controls the shared peripheral USB keyboard and mouse devices, emulates a combined keyboard and mouse USB device to each of the computer ports, emulates a separate PS/2 keyboard and PS/2 mouse device to each of the computer ports, and routes keyboard and mouse data from the shared keyboard and mouse devices to the selected one of the computer ports. The keyboard and mouse subsystem interacts with the anti-subversion subsystem 195 to provide keyboard data when the anti-subversion subsystem is selected by the control subsystem 160. The keyboard and mouse subsystem interacts with the smartcard subsystem 190 to accept keyboard data from the smartcard subsystem and supplies power to the smartcard subsystem.

The smartcard subsystem 190 includes an NCS module, a smartcard USB module and a smartcard switch module. The smartcard subsystem 190 enumerates and controls the shared peripheral USB CCID class smart card reader device 113, emulates a USB CCID class smartcard reader device to the selected computer port and passes keyboard data from any combined keyboard and smartcard reader to the keyboard and mouse subsystem.

The anti-subversion subsystem includes an anti-subversion module to provide enhanced security for the KVM switch. The anti-subversion module handles product authentication and active tamper detection. The anti-subversion subsystem 195 receives keyboard data from the keyboard and mouse subsystem when the anti-subversion channel is selected. The anti-subversion module can provide a simple hardware self checking scheme such that if a channel change occurs while the data paths are enabled, then an error LED pattern can be illuminated. The anti-subversion system 195 can also be connected to one or more contact switches or micro-switches (not shown). The switches operate if the casing of the KVM switch is removed and cause the anti-subversion system 195 to lock the KVM switch to prevent its further use. This is a further security measure which operates if unauthorised physical access to the electronic circuitry 130 is attempted so as to try and circumvent the security of the KVM switch.

Figure 3:
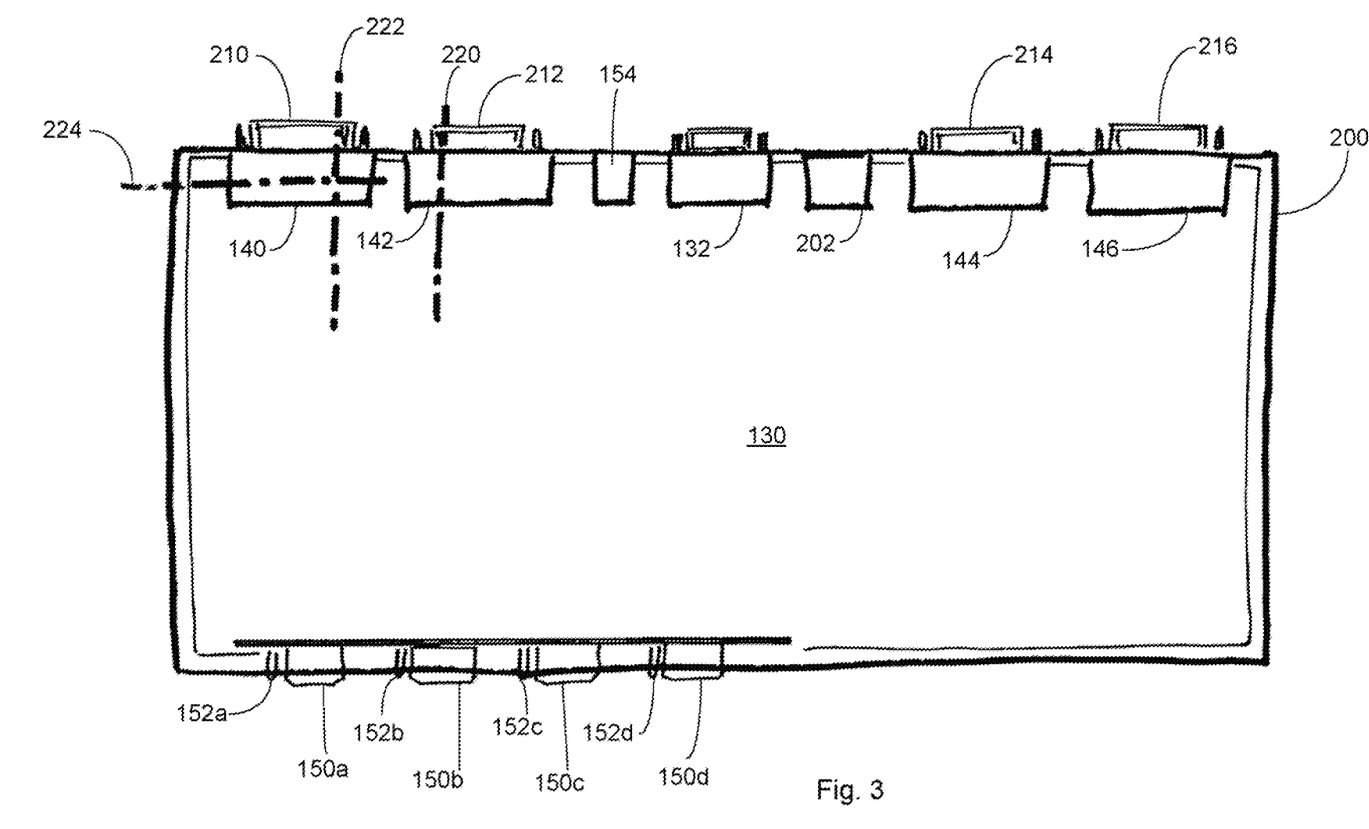
FIG. 3 shows a schematic diagram of the physical structure and connector layout of the KVM switch of FIG. 2.

FIG. 3 shows a schematic plan view of the secure KVM switch 106 illustrating the physical construction of the secure KVM switch rather than its electronic operation as illustrated in FIG. 2. The electronic circuitry 130 is located within an outer housing or casing 200 of the KVM switch. A rear face of the KVM switch exposes the four computer ports in the form of combined 26 pin D-type connectors 140-146, the external power connector 154, the combined monitor connector 132 and the stack 202 of three USB connectors 134, 136, 138. A front face of the KVM switch presents the four channel selection buttons 150a-150d and corresponding ones of the fours LEDS 152a-152d.

A 26-way high density D connector 210-216 is used for each computer port 140-146. This is chosen to make the cable connections easier for the user. The 26-way connector has pins for analogue VGA video including red, green and blue video signals, horizontal and vertical synchronization signals, display data channel signals (for EDID) and various grounding signals. Each connector 210-216 also has pins for USB for keyboard and mouse, USB for card reader functions, PS/2 keyboard and PS/2 mouse. In other embodiments separate connectors can be provided for each of these functions or types of data or a different style or type of port connector or connectors can be used, for example to implement digital video such as DVI, HDMI or Display Port rather than analog video.

The power connector 154, DE-15 pin video display connector 132 and keyboard, mouse and smart card USB connectors 202 are arranged toward the centre of the rear face of the casing so as to give the maximum physical separation between the first and fourth ports which physical separation also helps to reduce crosstalk according to an inverse square function of distance. The various connectors are mounted on a multi layer PCB of the electrical circuitry 130 and which is encased in a metal enclosure 200 that is well bonded electrically around its seams.

Figure 4:
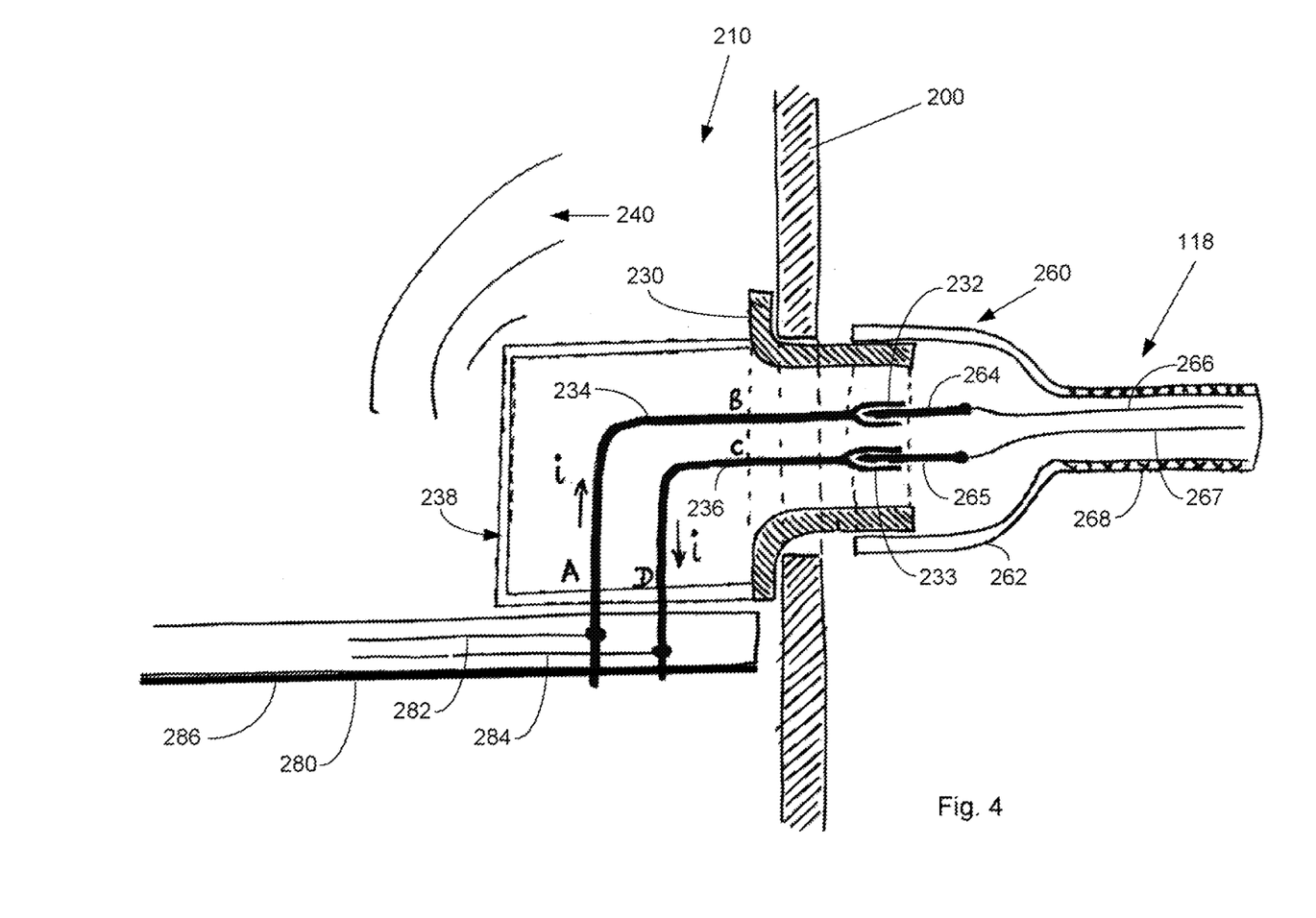
FIG. 4 shows a schematic cross-sectional diagram of a connector part.

FIG. 4 shows a schematic cross sectional drawing (for example along dashed line 222) of the 26-way D type connector 210 without the connector shield in place. The connector has a metal body 230 that abuts a part of a face of the metal enclosure 200 and makes electrical contact with both the enclosure wall 200 and a metal can 262 of the cable's plug connector 260. The male pins of the cable plug connector plug (e.g 264, 265 and of which only two are shown in FIG. 4) are each connected to a respective one of the wires (e.g. 266, 267 and again only two of which are shown in FIG. 4) in the cable 118 which are effectively shielded by both braid and foil shielding 268 of the cable 118 and the metal can 262 that is part of the cable's plug connector 260. The cable 118 is connected to the first computer 102. The computer connector 210 includes female connections 232, 233 which mate with the corresponding pins 264, 265 of the connector 260 and which are connected to respective tracks 282, 284 in the printed circuit board 280 by electrical connections 234, 236. Printed circuit board 280 includes a conducting ground plane 286 on a bottom most surface. The main body 238 of the connector 210 is made mostly of non-conductive plastic. As will be understood by a person of ordinary skill in the art, the connector 210 has multiple pins in other planes parallel to the plane illustrated in this cross sectional drawing.

In other embodiments, the connector 210 can include male electrical connectors and the computer connector 260 can include female electrical connectors. Irrespective of whether the physical electrical connectors of a connector are male or female, they will generally be referred to herein as 'pins' of the connector.

FIG. 4 represents a 2 dimensional simplification of a complex 3 dimensional system. Without wishing to be bound by theory, it is understood that the basic issue may be understood by considering a high frequency signal current i flowing through electrical connector 234 of a first pin and back through electrical connector 236 of a second pin. This arrangement is close to being a single turn of a transformer with a loop area defined by A, B, C and D which will generate electromagnetic emissions 240 into the adjacent space. These electromagnetic emissions 240 can be picked up by equivalent loops formed by the electrical connections in adjacent connectors, e.g, connector 212, causing port-to-port crosstalk.

Crosstalk between the first 140 and second ports 142 may be particularly susceptible to crosstalk caused by and picked up by effective conductor loops orientated parallel to dashed lines 222 and 220 due to the alignment and close physical proximity of these planes. Considering two such adjacent planes, and with reference to FIG. 5, it will be explained below how the connector shield acts to reduce port-to-port crosstalk.

Figures 5, 8:
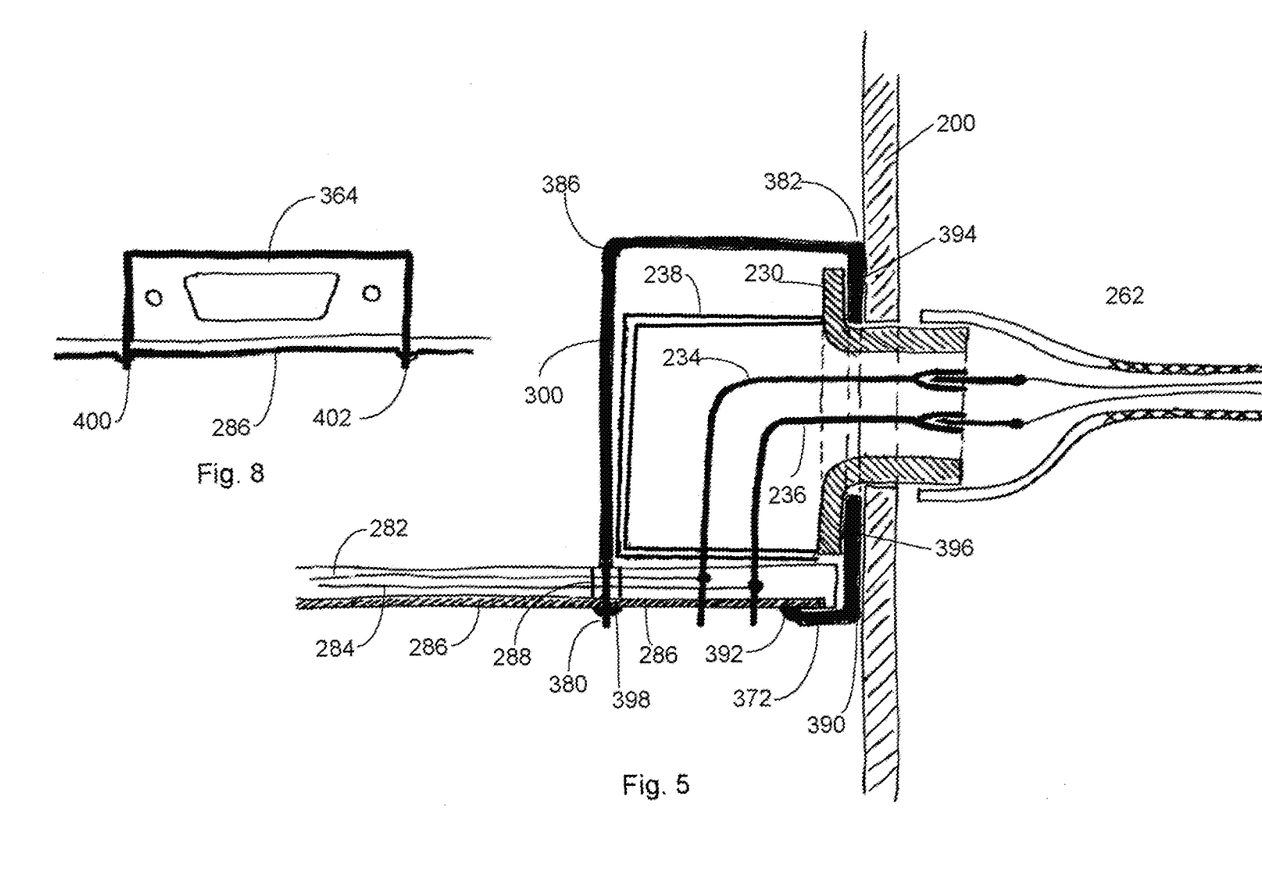
FIG. 5 shows a schematic cross-sectional diagram through the shielded connector, illustrating arrangement of the connector shield about the connector of FIG. 4.
FIG. 8 shows a schematic front view of the connector shield arranged about the connector of FIG. 4 illustrating a further current flow loop.
Figure 6:
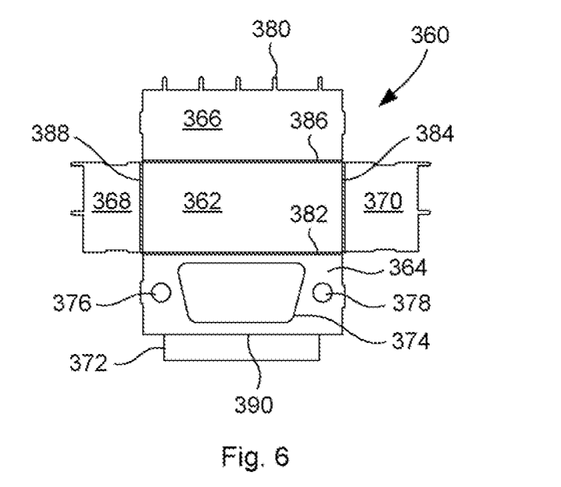
FIG. 6 shows a foldable blank of a shielding can part of the connector shield according to the invention.
Figure 7:
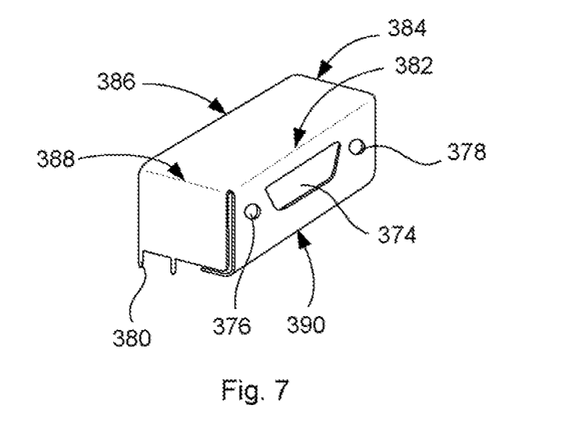
FIG. 7 shows the shielding can in an assembled form.

FIG. 5 is similar to FIG. 4 and shows the connector 210 of the first port 140 but including a connector shield 300 arranged around the connector 210 and in electrical contact therewith. The connector shield 300 is formed from a foldable blank 360 as illustrated in FIGS. 6 and 7.

The foldable blank 360 has an upper face 362 with a front face 364, a rear face 366, a first end face 368 and a second end face 370 extending therefrom. A tab 372 extends from a lower edge of the front face 364. The front face defines a first D-shaped aperture 374, and a second 376 and a third 378 circular aperture arranged to either side of the first aperture. Blank 360 is suitable for the 26 way high density D connector 210. The D shaped part of the connector 210 can fit through the first D shaped aperture 374 and the connector screw locks of the connector 210 can fit through the two circular apertures 376, 378. A plurality of metal fingers or digits, e.g. 380, extend from the lower edges of the rear face and end faces to provide electrical connections to the connector shield.

The shielding blank 360 is made from a thin sheet of photo etched metal whereby partial etching across fold lines 382, 384, 386, 388 between the faces and a fold line 390 between the front face 364 and tab 372 enables a shielding can to be created by folding the blank 360. The shielding can blank 360 can be made from nickel coated silver and the sheet can be about 0.20 mm to about 0.25 mm thick. FIG. 7 shows a perspective view of the shielding can part 390 of the connector shield formed by folding the shielding blank 360 along the fold lines. The blank 360 is folded along fold lines 382 to 390 to make the completed 3 dimensional screening can.

FIG. 5 shows the screening can assembled about the connector 210 in order to form part of the connector shield. The circuit board 280 includes a plurality of apertures 288 providing access through to the ground plane 286 of the circuit board. The extended finger electrical connectors 380 pass through the apertures are soldered into the circuit board and electrically connected to the circuit board ground plane. Tab 372 is directly soldered onto a mating area 392 of the circuit board that is part of the circuit board's ground plane. The D shaped part 230 of the connector 210 fits through the D shaped aperture 374 and the connector screw locks of the connector 210 fit through the two holes 376, 378.

The can is folded round the body 238 of the connector and sandwiched between the metal part of the connector 230 and the enclosure metal 200 at point 394. The same happens at point 396 and the shielding can is soldered onto the ground plane of the circuit board at point 392. The soldering of the electrical contact 380 of the shielding can back onto the ground plane at point 398 completes the 360 degree shielding of the connector pins. It can be seen that an electrically conductive 360 degree loop, providing a continuous path for current flow, is provided by the shielding can and the ground plane. This approach makes use of the ground plane 286 of the circuit board 280 to complete the 360 degree circuit, and so the ground plane provides a part of the connector shield.

The electromagnetic emissions produced from high frequency currents flowing in path A,B,C,D are counteracted by currents flowing in the 360 degree conductive connector shield that surrounds the connector in the same plane.

FIG. 8 shows a schematic front view of the shielding can in place around the connector 210. A further 360 degree conductive path or loop is also provided by the shielding can in plane 224 by soldering the shielding can to the ground plane 286 at point 400 then and also to the ground plane at point 402. Plane 224 is generally perpendicular to the plane in which the electrical conductors 234, 236 lie. The 360 degree conductive path or loop follows point 400, over the end face to corner 401, over the top face to corner 402, down the end face to point 403 and then back to 400 via the circuit board ground plane 286. However, it is believed that more significant levels of port to port crosstalk may occur due to currents flowing in plane 222 than in plane 224 and that therefore the shielding in plane 224 is likely to generally have a lesser effect.

The arrangements described reduce crosstalk due to the conductors of standard style connectors. However, to have the greatest overall effect, the similar shielding can be applied to the video connector 132 which should be considered as a further port as far as crosstalk is concerned because when the video signal is active, it can cross couple onto the other ports.

Figure 9:
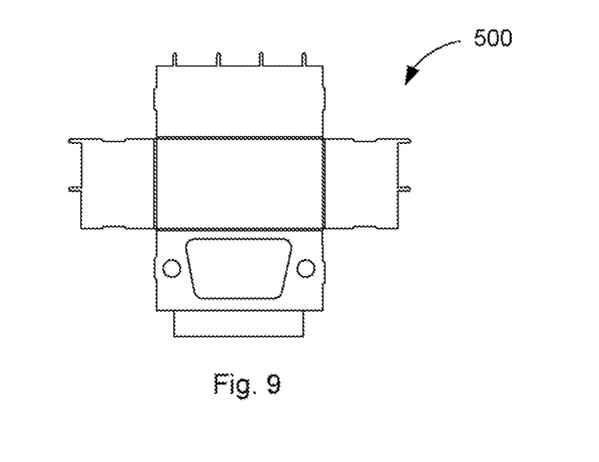
FIG. 9 shows a foldable blank of a shielding can part of a connector shield for a display connector according to the invention.

Accordingly, FIG. 9 shows a foldable blank 500 that is suitable for a shielding can part of the connector shield for the 15 way high density D connector 132. Its construction and operation are generally similar to that for foldable blank 360.

All the ports of the switch may be considered as being both aggressors and victims when it comes to crosstalk. However, shielding all the ports provides a double level of crosstalk protection. The aggressor port is shielded from the general space within the enclosure and the victim port is shielded form the general space within the enclosure. Furthermore, the arrangement described may also have some benefit in terms of reducing overall cable and enclosure emissions.

Although the shielding can may be partially effective without it, connection of the shielding can to the circuit ground at point 380 is particularly significant to the overall result because it creates the full 360 degree shield around the connector pins to provide the best level of protection against port-to-port crosstalk.

In other embodiments of the shielding can, the blank 360 includes a bottom face attached by a fold line to the lower edge of the rear face 366, and tab 372 and the contact fingers 380 are omitted so that a closed rectangular can can be formed by folding the blank and soldering the free edge of the bottom face to the lower edge of the front face (and similarly the lower edges of the end faces to the side edges of the bottom face. One or more apertures are provided in the bottom face to allow the electrical connectors to pass through the bottom face to the circuit board. Hence, the shielding can itself can provide all of the connector shield 360 degree current path closed loop without using the ground plane as part of the current path.

In other embodiments, the end faces 368, 370 of the shielding can can be omitted if they are not needed to help provide a current flow path around a loop in a plane parallel to plane 224.

Figures 10, 11, 12:
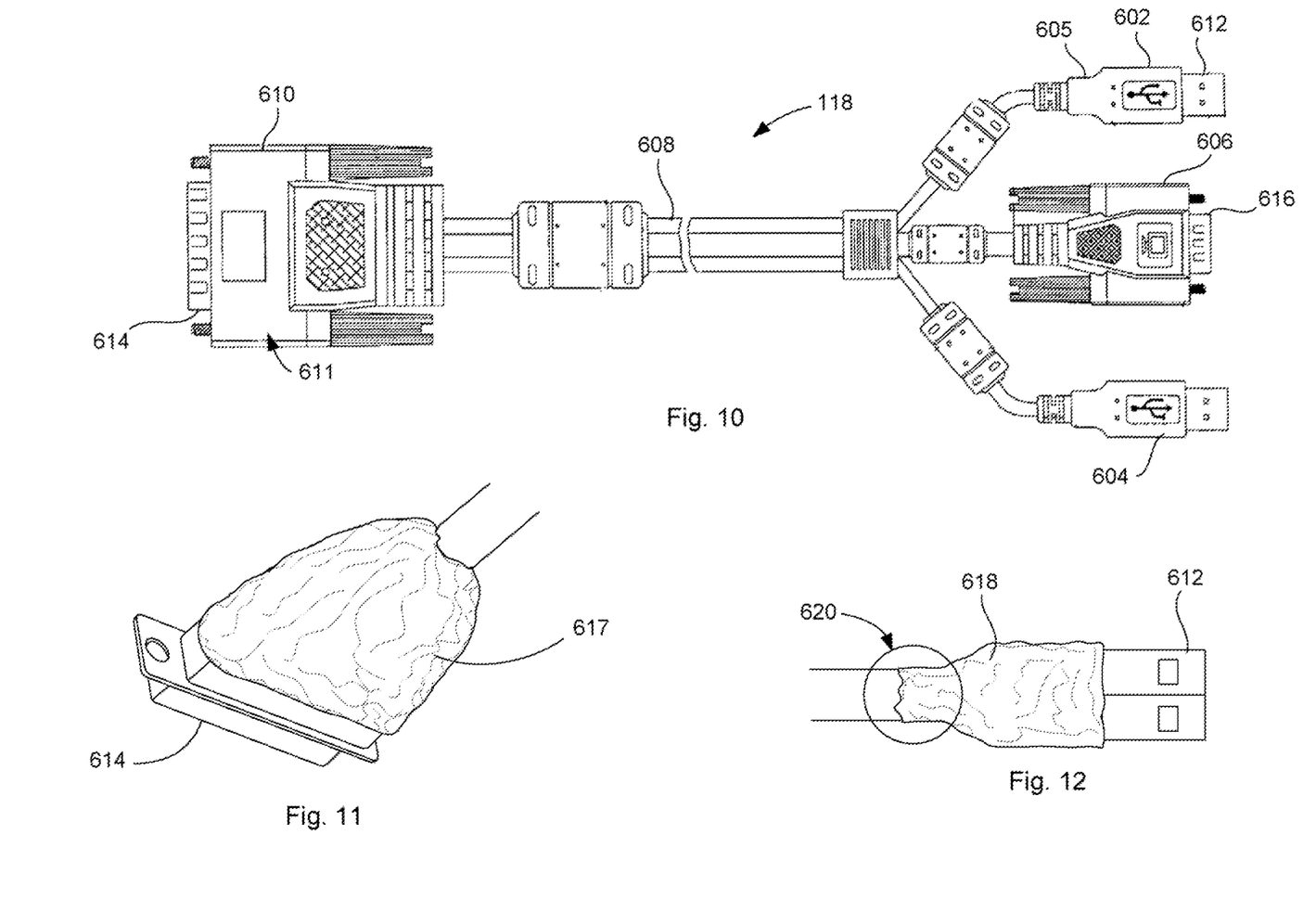
FIG. 10 shows a schematic view of a cable with shielded connectors as used in the computing system shown in FIG. 1.
FIG. 11 shows a perspective view of the interior of a connector of the cable shown in FIG. 10 including further shielding.
FIG. 12 shows a perspective view of the interior of a further connector of the cable shown in FIG. 10 also including further shielding.

With reference to FIG. 10 there is shown cable 118 in greater detail. As illustrated a computer end of the cable 118, includes a pair of USB connectors 602, 604 and a D type 15 pin video connector 606. The wires from the USB connectors and video connector pass along the main body of the cable 608 which includes electrical shielding in the form of a plurality of wire filaments surrounding the inner signal carrying wires. A KVM switch end of the cable 118 is terminated in a D type 26 pin connector for connecting the cable to the connector 210 of the KVM switch. Each of the connectors has a similar structure, and comprises a plastics outer housing, shell or casing 611, 605 and then a metal body or plug part, e.g. plug part 612 of the USB connectors or D shaped part 614, 616 of the D type connectors 606, 614.

Each of the connectors of the cable have been internally modified to include further shielding within the outer housing to improve the electrical shielding and further reduce any cross talk. FIG. 11 shows the KVM switch end connector 610 with the outer plastics housing 611 removed. The metal plug part 614 of the connector, which holds a support for the individual pins to which the wires of the cable are individually attached is surrounded by and soldered to a further shield 617 provided by electrically conductive foil. The metal foil is wrapped about the wires where they pass out from the end of the main body 608 of the cable. The shielding wires of the cable shielding are carefully splayed around the foil and are themselves soldered to the foil 617 so as to provide a good and generally uniform electrical connection between the shield 617 and the shielding wires of the main cable body 608.

Similarly, FIG. 12 shows the computer end USB connector 604 with the outer plastics housing 605 removed. The metal plug part 612 of the USB connector supports the individual contacts to which some of the wires of the cable are individually attached. The plug is surrounded by and soldered to a further shield 618 provided by electrically conductive foil wrapped about the wires where they pass out from the end 620 of the main body 608 of the cable. The shielding wires of the cable 608 are carefully splayed around the foil and are themselves soldered to the foil so as to provide a good and generally uniform electrical connection between the shield 618 and the shielding wires of the main cable body 608. USB connector 602 also has an internal shield similar to that of USB connector 604.

Hence, the internal connector shielding 617, 618 co-operates with the metallic plug parts of the connector and the shielding wires of the main cable 608 to provide a further shielding effect to further reduce cross talk and hence help maintain the security of secure computer 102 when being operated via secure KVM switch 106.

Although the above has generally described the present invention in relation to a secure KVM switch, the present invention has a much broader range of applicability. In particular, aspects of the present invention are not limited to any particular kind of electronic device, nor only to increasing security and can be applied to virtually any kind of electronic device having one or more electrical ports and wherein it would be advantageous to be able to reduce electromagnetic emissions from those ports. Thus, in some embodiments, the connector shield could be used simply to reduce electromagnetic emissions for any purpose. Other specific forms of shielding can and arrangements of the shielding can can be used to provide all or part of the conductive loop along which shielding currents can be induced. One of ordinary skill in the art would recognize other variants, modifications and alternatives in light of the foregoing discussion.

What is claimed is:

1. An electronic device, comprising:
   a housing;
   electronic circuitry enclosed within the housing;
   a plurality of ports for connecting electrical devices to the electronic device, wherein each port includes:
   a connector, wherein the connector is connected by at least one electrical connection to the electronic circuitry; and
   a connector shield including a shielding can having at least a front face, an upper face and a rear face, and wherein the front face defines an aperture therein that provides access to the connector, and wherein the connector shield is arranged around the connector to provide a first electrically conductive loop around the connector that includes the front face such that an induced electrical current induced by electrical signals passing through the connector can flow around the first electrically conductive loop to reduce cross-talk between ports.

2. An electronic device as claimed in claim 1, wherein the connector shield is in electrical contact with a metal part of the connector and wherein the metal part of the connector provides a part of the first electrically conductive loop.

3. An electronic device as claimed in claim 1, wherein the shielding can also has a first end face and a second end face and wherein the connector shield is arranged around the connector with the front face, first end face, rear face and second end face providing a second electrically conducting loop around the connector perpendicular to the first electrically conducting loop.

4. An electronic device as claimed in claim 1, wherein a part of the connector shield is provided by an electrically conductive part of the electronic circuitry.

5. An electronic device as claimed in claim 4, wherein the electrically conductive part is a ground plane of the electronic circuitry, the ground plane forming part of the first electrically conductive loop.

6. An electronic device as claimed in claim 5, wherein the electronic circuitry includes a printed circuit board and the ground plane is a part of the printed circuit board.

7. An electronic device as claimed in claim 6, wherein the shielding can includes a plurality of extended contacts and the printed circuit board includes a plurality of apertures and wherein the plurality of extended contacts pass through the apertures to electrically connect to the ground plane.

8. An electronic device as claimed in claim 1, wherein an electrical current is conducted along the at least one electrical connection in a first plane and wherein the connector shield is arranged to provide the first electrically conductive loop in a second plane parallel to the first plane.

9. An electronic device as claimed in claim 1, wherein the at least one electrical connection is arranged to conduct an electrical current in a first plane and wherein the connector shield is arranged to provide the electrically conductive loop in a second plane perpendicular to the first plane.

10. An electronic device as claimed in claim 1, wherein the electronic device is a KVM switch.

11. A computing system, comprising:
    a first computing device;
    a second computing device;
    an electronic device as claimed in claim 1, having a first connector and a second connector;
    a first cable between the first computing device and the first connector; and
    a second cable between the second computing device and the second connector.

12. A computing system as claimed in claim 11, wherein the first cable is a shielded cable including a plurality of wires and has a first cable connector and the second cable is a shielded cable including a plurality of wires and has a second cable connector and wherein each cable connector comprises:
   a housing;
   a plurality of electrical contacts;
   a support supporting the plurality of electrical contacts, and wherein each wire of the plurality of wires is attached to a respective one of the plurality of electrical contacts; and
   an electrical shield connected between the support and the shielding of the cable and surrounding the plurality of wires adjacent where they attach to the electrical contacts and arranged to electromagnetically shield the cable connector.

13. A computing system as claimed in claim 11, wherein the electronic device is a secure KVM switch and wherein the first computer is a secure computer and the second computer is a less secure computer and wherein the system further comprises at least one input device attached to the secure KVM switch.

14. A electric device as claimed in claim 1 wherein the shielding can has a body formed of a folded sheet of electrically conductive material.

15. A shielding can as claimed in claim 14, wherein the shielding can has a generally rectangular shape.

16. A shielding can as claimed in claim 14, wherein the body includes fold regions created by less thick parts of the shielding can.

17. A shielding can as claimed in claim 14, wherein the shielding can includes a plurality of extended electrical contacts which extend from one or more edges of the body.

18. A shielding can as claimed in claim 14, wherein the face of the body further defines a pair of apertures positioned about the first aperture to receive a pair fixings for securing a plug to the connector.

19. A method for reducing the cross-talk between ports of an electronic device, the electronic device including a housing and electronic circuitry enclosed within the housing, each port including a connector connected by at least one electrical connection to the electronic circuitry, the method comprising:
   providing a plurality of connector shields, each connector shield being arranged about an associated connector, each connector shield having a front face, an upper face and a rear face, wherein the front face defines an aperture therein, and wherein the aperture is arranged to provide access to the connector and wherein each connector shield is arranged to provide an electrically conductive loop around the associated connector that includes the front face; and
   wherein electrical signals passing through the connectors induce electrical currents to flow about the electrically conductive loop of the associated connector shields to reduce cross-talk between ports.

* * * * *